(12) United States Patent
Bielecki et al.

(10) Patent No.: US 12,090,554 B2
(45) Date of Patent: Sep. 17, 2024

(54) METHOD AND DEVICE FOR PRODUCING HEAVY METAL POWDERS BY ULTRASONIC ATOMIZATION

(71) Applicant: 3D LAB SP. Z O.O., Warsaw (PL)

(72) Inventors: Marcin Bielecki, Warsaw (PL); Robert Ralowicz, Warsaw (PL); Lukasz Sloboda, Warsaw (PL)

(73) Assignee: 3D LAB SP. Z O.O., Warsaw (PL)

( * ) Notice: Subject to any disclaimer, the term of this patent is extended or adjusted under 35 U.S.C. 154(b) by 141 days.

(21) Appl. No.: 17/619,548

(22) PCT Filed: Jul. 14, 2020

(86) PCT No.: PCT/IB2020/056633
§ 371 (c)(1),
(2) Date: Dec. 15, 2021

(87) PCT Pub. No.: WO2021/009683
PCT Pub. Date: Jan. 21, 2021

(65) Prior Publication Data
US 2022/0305554 A1   Sep. 29, 2022

(30) Foreign Application Priority Data

Jul. 16, 2019 (PL) ......................................... 430614
Jun. 12, 2020 (EP) .................................... 20179851

(51) Int. Cl.
  *B22F 9/08*  (2006.01)
  *B22F 1/052*  (2022.01)
  (Continued)

(52) U.S. Cl.
  CPC .............. *B22F 9/08* (2013.01); *B22F 1/052* (2022.01); *B22F 1/065* (2022.01); *B22F 9/082* (2013.01);
  (Continued)

(58) Field of Classification Search
  CPC ...................... B22F 9/08–14; B22F 2002/01
  See application file for complete search history.

(56) References Cited

U.S. PATENT DOCUMENTS

| 3,275,787 A | 9/1966 | Newberry |
| 4,284,393 A | 8/1981 | Brunosson et al. |
| 10,744,590 B2 | 8/2020 | Maier et al. |

FOREIGN PATENT DOCUMENTS

| CN | 1422718 A | 6/2003 |
| CN | 103433499 A | 12/2013 |

(Continued)

OTHER PUBLICATIONS

Baboian, Robert. NACE Corrosion Engineer's Reference Book (4th Edition). NACE International. (2016)) (Year: 2016).*

*Primary Examiner* — Samir Shah
*Assistant Examiner* — Sean P. O'Keefe
(74) *Attorney, Agent, or Firm* — Mark Malek; Widerman Malek, PL

(57) ABSTRACT

The invention relates to a production method of the powders composed of spherical heavy metal particles utilizing an ultrasonic atomization, where these powders can be applied in industrial applications, like additive manufacturing and several other. The method for production of heavy metal powders by ultrasonic atomization comprises providing a heavy metal raw material (5) in the vicinity of a heat source (13) being an electric arc (13), heating the heavy raw material (5) by the electric arc (13), so as to create a molten metal pool (21) on a sonotrode (3), the molten metal pool (21) having a temperature equal to or greater than the melting temperature of the heavy metal raw material (5), but below the vaporization temperature of the heavy metal raw material (5), providing ultrasonic mechanic vibrations by the sonotrode (3) to the molten metal pool (21), so as to cause the heavy metals droplets (11) being ejected from the molten (Continued)

metal pool (21), directing the ejected heavy metal droplets (11) away from the molten metal pool (21), so as the heavy metal droplets (11) freely cool down within a predetermined distance at least by radiation and transform to a heavy metal powder (11), collecting the heavy metal powder (11), so as to collect at least 75% of the heavy metal raw material (5) in the form of the heavy metal powder (11').

16 Claims, 9 Drawing Sheets

(51) Int. Cl.
  *B22F 1/065* (2022.01)
  *B22F 9/14* (2006.01)
  *B22F 10/32* (2021.01)
  *B22F 10/322* (2021.01)
  *B22F 10/368* (2021.01)
  *B22F 12/13* (2021.01)
  *B22F 12/41* (2021.01)
  *B33Y 40/10* (2020.01)
  *B22F 10/77* (2021.01)

(52) U.S. Cl.
  CPC ............ *B22F 10/32* (2021.01); *B22F 10/322* (2021.01); *B22F 10/368* (2021.01); *B22F 12/13* (2021.01); *B22F 12/41* (2021.01); *B33Y 40/10* (2020.01); *B22F 2009/0836* (2013.01); *B22F 2009/086* (2013.01); *B22F 2009/0876* (2013.01); *B22F 9/14* (2013.01); *B22F 10/77* (2021.01); *B22F 2202/01* (2013.01)

(56) References Cited

FOREIGN PATENT DOCUMENTS

| | | | |
|---|---|---|---|
| CN | 105855558 A | 8/2016 | |
| CN | 106513692 A | 3/2017 | |
| CN | 107138733 A | 9/2017 | |
| CN | 109317687 A | 2/2019 | |
| DE | 2656330 A * | 6/1978 | ............... B22F 9/08 |
| DE | 30 19 047 A1 | 12/1980 | |
| DE | 31 50 221 A1 | 7/1983 | |
| EP | 3 216 545 A1 | 9/2017 | |
| GB | 1 528 964 | 10/1978 | |
| GB | 2 187 762 A | 9/1987 | |
| WO | WO-2019092641 A1 * | 5/2019 | ............ B22F 1/0048 |

* cited by examiner

METHOD AND DEVICE FOR PRODUCING HEAVY METAL POWDERS BY ULTRASONIC ATOMIZATION

The invention relates to a production method of heavy metal powders composed of spherical particles utilizing an ultrasonic atomization, where these powders can be applied in industrial applications, like additive manufacturing and several other. The invention relates also to a device implementing such method.

One of the methods of producing the high-quality metallic powders is the method of ultrasonic atomization. Such powders find application as a raw material for 3D printing in additive technologies, powder metallurgy (sintering) and special-purpose metallic coatings. In the past noble-metal elements and heavy elements like Pt, Mo, Au, U, Pd, Ta and their alloys were produced by different versions of a gas atomization, where a quality of obtained powder does not satisfy all requirements applicable in the additive manufacturing, mostly porosity of produced objects. Typically, the powders preferred for the additive manufacturing are in the particle size distribution D10-D90 of 15-80 microns, while the atomization parameters are set up for a specific raw material, in order to get the average grain size D50 between 25 and 65 microns. The applications for these powders are mostly in:
- Sintering of powders on 3D printers in additive manufacturing process;
- Preparation of catalyst additive for automotive, chemical, oil&gas, pharmaceutical and other industries;
- Preparation of electrode catalyst powder for a polymer electrolyte fuel cell or SOFC;
- Production of spark plugs and high temperature electrodes;
- Sensors e.g. oxygen detectors, thermocouples, magnetic field, if powder is very clean;
- High temperature nozzle e.g. for casting, gas atomization, in combustion chambers;
- Conductive contact coatings for high-temperature electronics;
- Ornaments and jewelry;
- Metal injection molding.

STATE OF THE ART

Powder Production Systems Based on the Ultrasonic Atomization

In the basic ultrasonic atomization technology, the material is atomized due to the instability of the capillary waves in the liquid. After overcoming the surface tension and viscous forces, droplets are periodically ejected with a frequency of ultrasonic excitation. This technique is commonly used at low temperatures, i.e. for atomization of water-based solutions or organic solvents, production of tin solders powders. The overall concept in several versions dedicated to metal powders has been presented in DE3150221A1, U.S. Pat. No. 3,275,787A, CN1422718A or WO2019/092641A1 of the Applicant. However known methods of metal powder production based on the ultrasonic atomization are not applicable for heavy and noble metals.

Heavy Powder Production Systems Based on the Gas Atomization

EP3216545 describes a production method of powders of noble metals, where the atomization process is preferably a gas atomization, a plasma atomization, a centrifugal atomization or a crucible-free atomization. As the noble metals' powder application was an additive manufacturing, a classification on sieves was mandatory after all mentioned types of atomization to meet criteria for powder size range. This supplementary classification is required due to the fact that the gas atomization process results always in the particles being in wide range of diameters (usually from 15 to 120 micron in single batch) with medium sphericity, while the fractions below 65 microns are produced with yield less 50% of the feedstock.

The additive manufacturing industry expects the powders of premium quality. One of key parameter is to obtain a powder of high flowability and this is directly correlated with the powder sphericity. Moreover, the maximum diameter of powder (D90) is preferred as low as possible from the same reason as well as lower grain size and porosity in final product made of such powder. Typical 3D printers dedicated to sinter noble metal with low roughness of surface finish require the powders with D90 below 70 microns. On the other hand, the very fine powder below 10 microns has poor flowability, what affects adversely dispersion of powder onto the bed and in effect 3D printing quality. In order to meet both criteria for minimum and maximum powder range, a property like Span is a key metrics to qualify a powder batch for the 3D printing application:

$$\text{Span} = D90 - D10 / D50$$

The other key property of products sintered of premium alloys (not only 3D printed), it is their low porosity, which is function of factors like flowability and low spread between minimum and maximum diameter of the powder (preferably D90-D10<60 micron). The flowability is correlated to particle shapes and dry friction against each other. The highest and most desirable flowability is obtained for particles as much spherical as possible, what can be obtain easily by ultrasonic atomization. The importance of the powder diameter spread can be anticipated from FIG. 8, which shows a correlation of the powder diameter range D90-D10 vs. porosity as measured on the 3D printed object made of noble metals. The data points collected in FIG. 8 are based on test carried out by D. Maier and S. Humm for Heraeus Deutschland GmbH on materials: pure iridium, silver, gold, Pt80Ru20 and Pt50Ru50 alloys, after sintering with same parameters by a selective laser melting (SLM) technique on the machine ConceptLaser, model MLab. The porosity here were calculated based on sample density. To summarize, ultrasonic atomization of metals and their alloys is the most suitable method of metal atomization regarding quality of the powders, namely span and sphericity of particles. An additionally further classification process can be applied on request. However, for most applications the powders obtained by the ultrasonic atomization are already of very good quality allowing direct usage e.g. in additive manufacturing without subsequent sieve classification in the integrated system.

This is why in the past a device and a method for ultrasonic atomization was developed by the Applicant (see WO2019/092641A1) to produce the powders made of typical structural alloys available commercially e.g. stainless steel, Inconel (Ni-based) or titanium alloys. However, said known device and method for ultrasonic atomization is not efficient to produce heavy and noble metal powders of satisfactory quality as reached for above typical structural alloys.

To highlight the essentials of the ultrasonic atomization is, one can compare these structural alloys to pure heavy elements or their alloys, preferably noble metals, due to the fact the steel as well as Ni—/Ti—/Co-based alloys present other—easier for processing at high temperature—material properties, like:

- lower density, what means that less energy is needed to melt and then eject droplets from molten metal pool,
- lower reflectivity for the radiation in infrared wavelength, what is very beneficial during heating by the electric arc or laser beam,
- lower melting temperature and concurrently enthalpy, which are important for energy efficiency of entire atomization process,
- usually lower thermal and electrical conductivity, what exaggerate a thermal gradient in the molten metal pool, if heated by the electric arc,
- lower surface tension for alloys than pure elements, what is a desirable property in order to reduce the powder mean particle size (D50) and energy consumption for droplets formation.

Among them, the most important for the production of powders by ultrasonic atomization are: density, melting temperature and reflexivity—see Table 1 with property comparison and FIG. 7 with reflectivity chart of several elements.

TABLE 1

Comparison of basic material properties for different metals.

| Alloy or Element | | Density [kg/m^3] | Melting temp. [deg K] | Reflectivity @ 850 nm | Heavy/noble metal |
|---|---|---|---|---|---|
| Ti Gr5 | Ti -based | 4430 | 1933 | 50% | NO |
| Steel 316L | Fe-based | 8000 | 1673 | 61% | |
| Inconel 718 | Ni-based | 8190 | 1609 | 68% | |
| CrCo | Co- based | 8400 | 1633 | 63% | |
| Copper | Cu | 8960 | 1358 | 96% | YES |
| Molibdenium | Mo | 10280 | 2883 | 55% | |
| Silver | Ag | 10490 | 1234 | 96% | |
| Palladium | Pd | 12023 | 1828 | 78% | |
| Rhodium | Rh | 12410 | 2237 | 84% | |
| Hafnum | Hf | 13310 | 2500 | N/A | |
| Uranium | U | 19100 | 1405 | 59% | |
| Gold | Au | 19300 | 1336 | 98% | |
| Platinum | Pt | 21450 | 2045 | 76% | |
| Iridium | Ir | 22590 | 2719 | N/A | |

Due to these differences in material properties, the production of powder by the ultrasonic atomization for applications requiring heavy metals, preferably noble ones, cannot be performed efficiently or even at all by known methods and devices for the ultrasonic atomization, because of their unsuitable parameters and construction. Known devices and methods do not guarantee sufficient energy transfer to the raw material as well cause important raw material losses in case of heavy and noble metals.

Problem to be Solved by the Invention

The problem to be solved by the invention is thus to provide a method and a system for heavy metal powders production by ultrasonic atomization that would overcome disadvantages of the known methods, namely that would be efficient in terms of energy transfer to the raw material and in terms of material losses as well as would allow to obtain a premium quality heavy metal powders even before or without classification process.

SUMMARY OF THE INVENTION

According to the present invention a method of heavy metal powders production by ultrasonic atomization is provided. The method comprises providing a heavy metal raw material in the vicinity of a heat source being an electric arc, heating the heavy metal raw material by the electric arc, so as to create a molten metal pool on a sonotrode, the molten metal pool having a temperature equal to or greater than the melting temperature (liquidus) of the heavy metal raw material, but below the vaporization temperature of the heavy metal raw material, providing ultrasonic mechanic vibrations by a sonotrode to the molten metal pool, so as to cause the heavy metals droplets being ejected from the molten metal pool, directing the ejected heavy metal droplets away from the molten metal pool, so as the heavy metal droplets freely cool down at least by radiation within a predetermined distance and transform to a heavy metal powder, collecting the heavy metal powder, so as to collect at least 75% of the heavy metal raw material in the form of desirable the heavy metal powder.

Advantageous embodiments of the invention are defined by dependents claims.

According to another aspect of the invention a device for production of heavy metal powders by ultrasonic atomization is provided. The device comprises feeding means for providing a heavy metal raw material in the vicinity of a heat source being an electric arc, the heat source heating the heavy raw material by the electric arc, so as to create a molten metal pool on a sonotrode, the molten metal pool having a temperature equal to or greater than the melting temperature of the heavy metal raw material, but below the vaporization temperature of the heavy metal raw material, the sonotrode providing ultrasonic mechanic to the molten metal pool, so as to cause the heavy metals droplets being ejected from the molten metal pool, at least feeding means parameters, heating means parameters and sonotrode parameters adjusting means for directing the ejected heavy metal droplets away from the molten metal pool, so as the heavy metal droplets freely cool down at least by radiation within a predetermined distance and transform to a heavy metal powder, colleting means for collecting the heavy metal powder so as to collect at least 75% of the heavy metal raw material in the form of the heavy metal powder.

By using the electric arc as a heating source, the melting process can be performed more efficiently than other heating methods as e.g. induction heating or by laser beam, because about 80% the electric energy can be transferred directly to the molten metal pool. It is also the cheapest method of heating to be implemented within an equipment of that size.

Thanks to keeping the temperature of the molten metal pool having a temperature equal to or greater than the melting temperature of the heavy metal raw material, but below the vaporization temperature of the heavy metal raw material, the metal in the pool is kept in liquid form to allow establishing capillary waves on the surfaces of the pool but does not evaporate by causing additional losses of the raw material.

By controlling the flight distance of the droplets ejected after the atomization step the cooling time of droplets can be effectively controlled until they cool down into a powder.

By cooling down the droplets, so that their temperature decreases below 70% of the melting temperature of the heavy metal raw material, the losses of the raw material in the process are significantly reduced.

Moreover, in one embodiment, by increasing/decreasing primary gas velocity, its pressure and its temperature the heavy metal powder can be obtained at a desired location within the closed volume and reduced dimensions of that volume.

Moreover, thanks to directing and cooling down the ejected heavy metal droplets in a controlled manner the production method described in this invention allows to reduced size of the atomization chamber particularly for metals of highest density and helps to produce the premium quality heavy and noble metal powders at high yield before or even without the subsequent classification process.

The method according to the invention can be implemented in a device having small or medium dimensions depending on the used atmosphere and used both in laboratory and industrial applications, when a small amount of very expensive powder is on demand. For the embodiment with atomization "in the gas", the chamber main dimensions can be less than 1 m in length (in direction of flowing droplets/powder) and 0.3 m on high and diameter. For the embodiment with atomization in the "vacuum", the chamber main dimensions can be less than 2 m in diameter and 4 m on high. Hence the "vacuum" configuration occupied about 100 more volume, than at process with gas, with similar production output. Nevertheless, both configurations are much smaller than typical atomization chambers for gas atomization in the industry, which are scaled to produce at least 50 kg/hr of the powder and preferably more than 200 kg/hr.

The method and the device according to the invention produces highly spherical powder of desirable mean diameter and low span in the particle size distribution. As a consequence, powder has high flowability and superior properties, suitable to direct application in 3D printing or sintering without supplementary classification. Preferably production output is less than 500 ml/hr of the powder.

BRIEF DESCRIPTION OF DRAWINGS

Other advantages and features will become apparent on reading the description of the invention and from the appended drawings, in which.

DETAILED DESCRIPTION OF EMBODIMENTS

The method for production of heavy metal powders by ultrasonic atomization according to the invention is of particular use for production of heavy metal powders with the process efficacy no more than 1000 ml/hr and preferably less than 500 ml/h of raw material 5. Such efficacy is required and well seen by producers of components made of very expensive noble metals, where small amounts of metal powders are used or high costs of raw material 5 makes big scale production unnecessary or impossible due to the limited amount of needed powder or available raw material 5 supply.

Here, the term 'heavy metal' covers any electric conductive metal of density >8500 kg/m^3 and melting temperature (liquidus) >1073 deg K=800 C at 1 barA, preferably noble and heavy metal elements, more preferably gold, silver, copper, platinum, palladium, iridium, ruthenium, rhodium, uranium, tantalum, osmium, hafnium or any alloy composed of them as well other elements, if such alloy meets above density and meting temperature limits.

Figure 1:
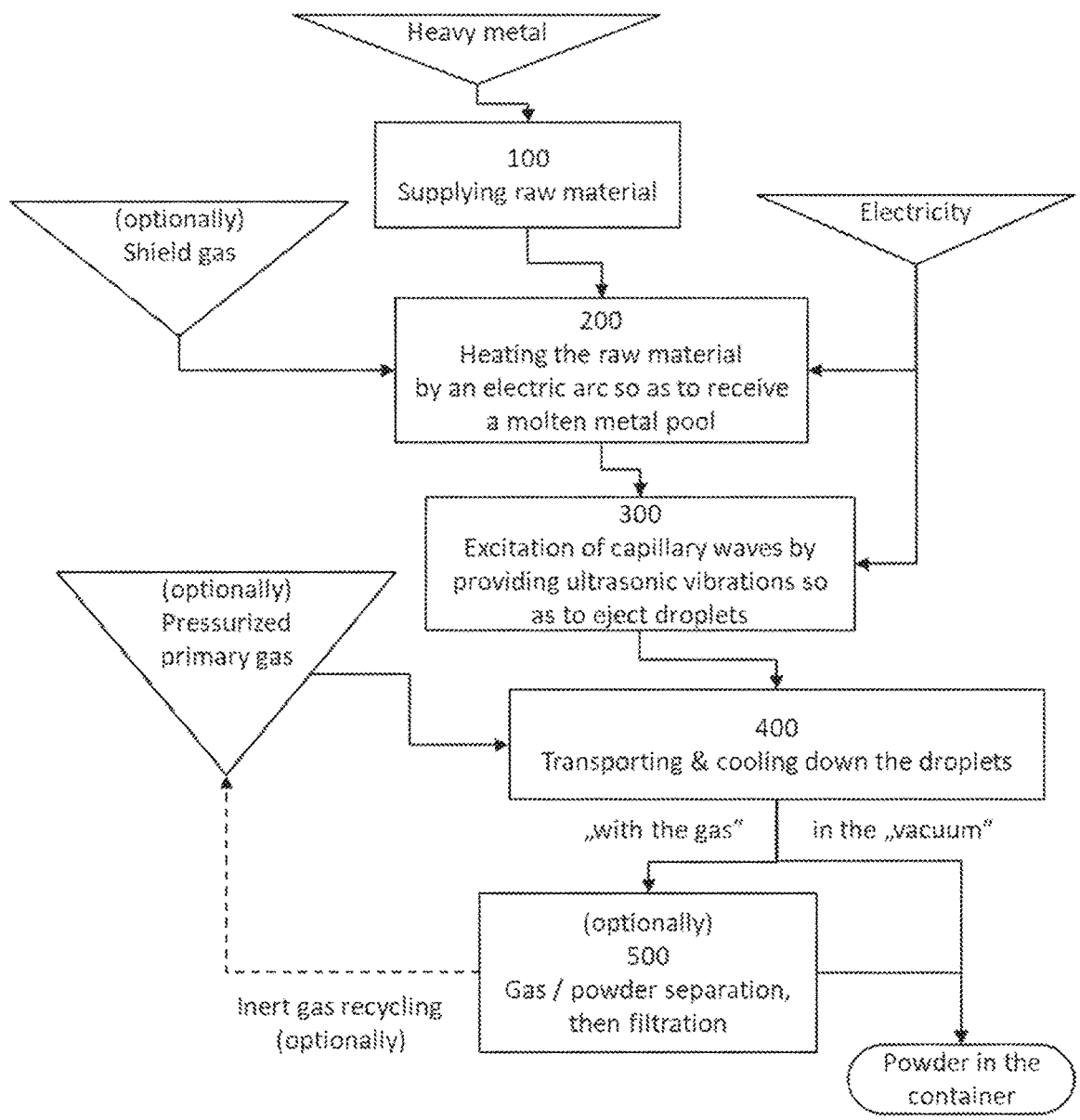
FIG. 1 shows a process map of the method according to the invention.
Figure 2A:
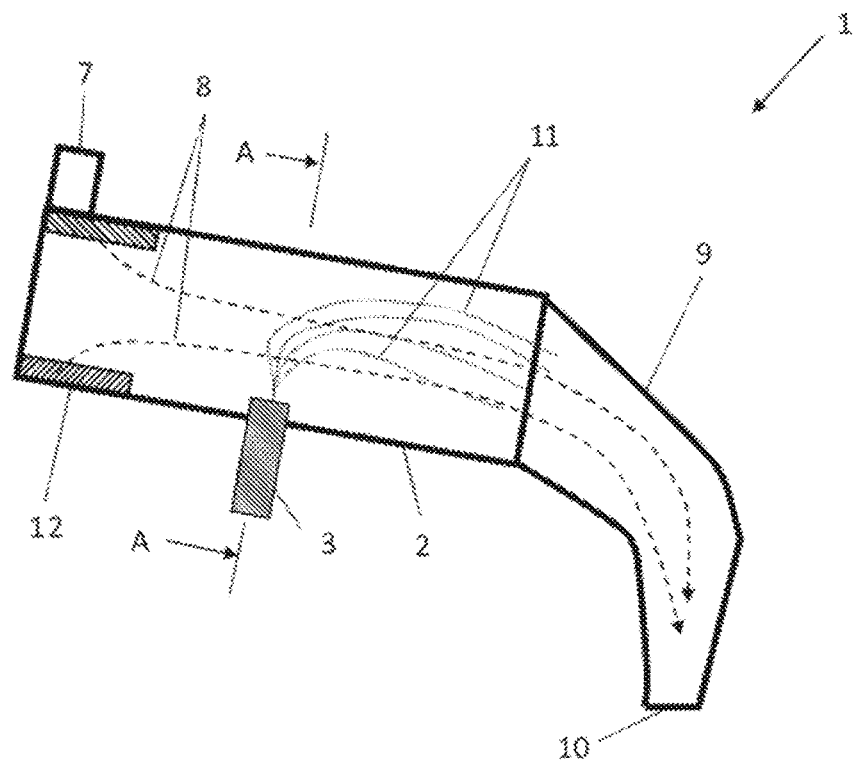
FIGS. 2a and 2b schematically show the device for heavy metal powders production by ultrasonic atomization "with gas".
Figure 2B:
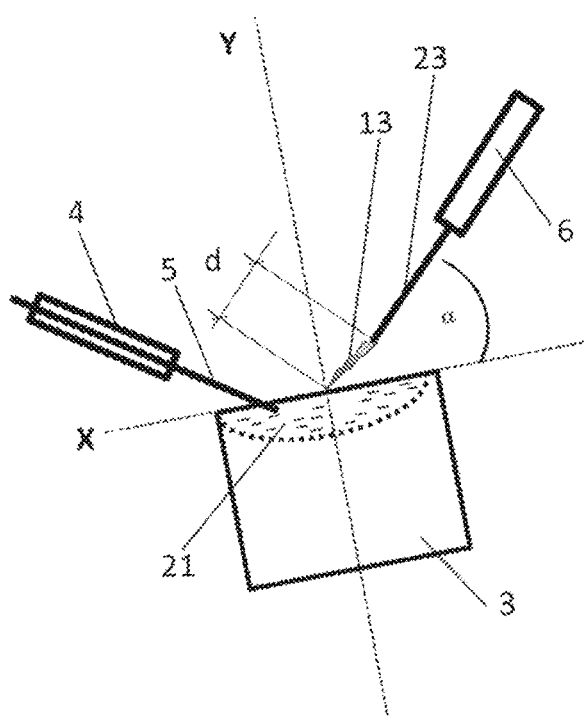
Figure 2C:
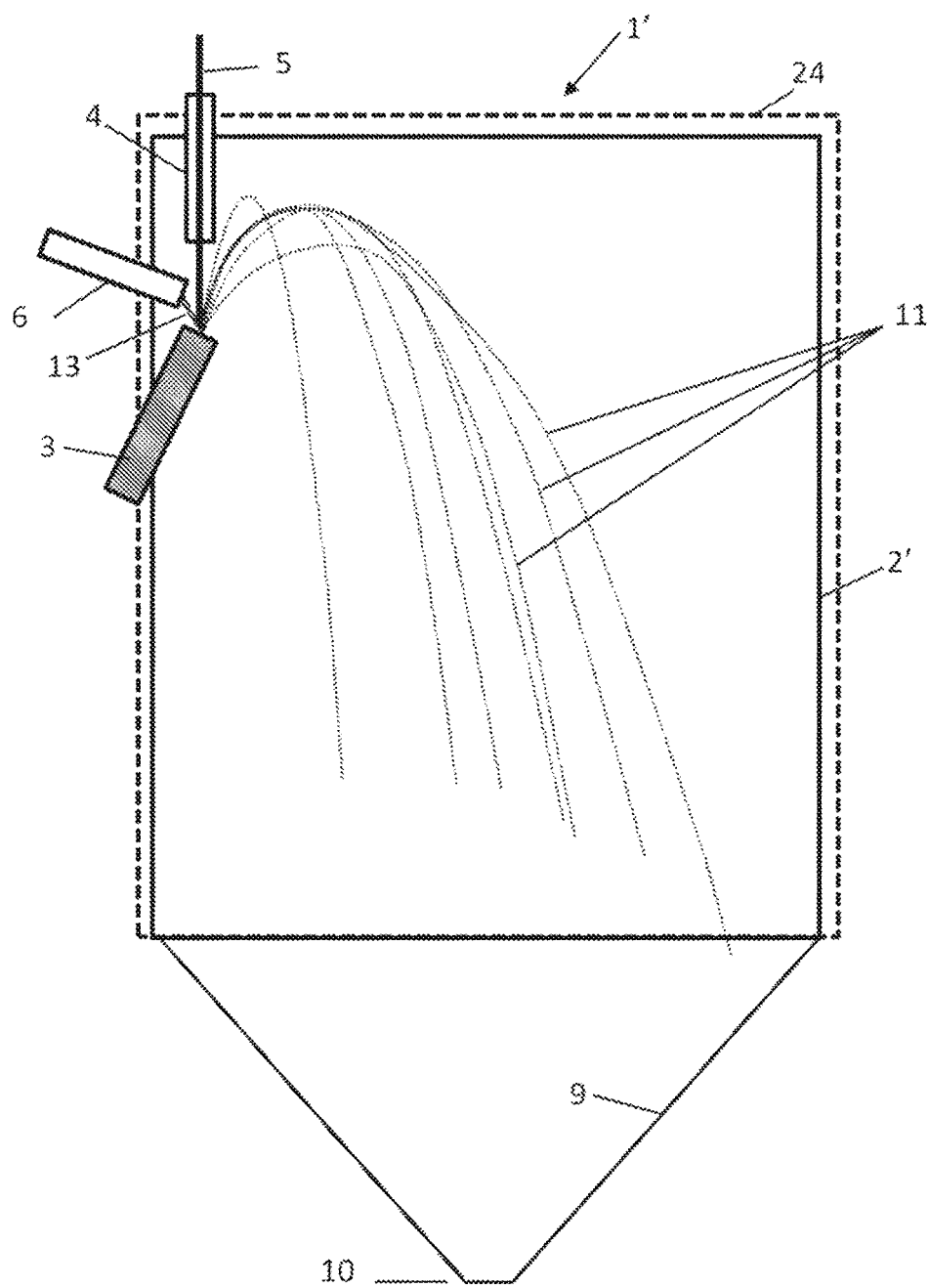
FIG. 2c schematically shows the device for heavy metal powders production by ultrasonic atomization in the "vacuum".

The method of production of heavy metal powders according to the invention comprises several steps which are shown in FIG. 1. The method according to the invention can be implemented in a device 1 for production of heavy metal powders according to the embodiment with gas as shown in FIG. 2A and FIG. 2B as well as in a device 1' for production of heavy metal powders according to the embodiment with vacuum as shown in FIG. 2C. It should be noticed, that the method for producing heavy metal powders according to the invention takes place in a closed volume, namely in a sealed chamber 2 filled or not with a gas 8 (chemically inert). The method of production of heavy metal powders according will be described for two different embodiments, the first named hereinafter "in vacuum", the second one named "with gas". The term "in vacuum" is used here as meaning conditions in which the chamber 2' (called hereinafter the vacuum chamber 2') is preferably filled with the gas 8' at reduced pressure in range 0.0001-0.01 barA. In the embodiment "with gas" the chamber 2 is filled with the primary gas 8 (chemically inert) at pressure in the range 0.01 to 6 barA, but preferably 1-1.5 barA.

The method for production of heavy metal powders by ultrasonic atomization according to the invention begins by a step 100 of providing a heavy metal raw material 5 in the vicinity of a heat source 13. The raw material 5 is preferably in the form of a wire or rod, however can be also poured onto the sonotrode 3 as pellets.

The raw material 5 before entering the closed volume, for example the atomization chamber 2 or the atomization vacuum chamber 2' is typically cleaned of dirt (e.g. industrial dust, lubricants after wire production).

The size of the wire or rod as well as the speed of passing the raw material 5 is adjusted according to a required production output and progress in its melting. In practice, feeding can be provided by a feeder arrangement 4, which will be described in reference to FIG. 2B and FIG. 2C.

Next step is a step 200 of melting heavy metal raw material 5 within a molten metal pool 21. In said step the heavy metal raw material 5 receives enough thermal energy, in order to heat up from the ambient temperature at supply conditions and then changes its state to a liquid one. As a result, a molten metal is formed within the molten metal pool 21.

One of methods to heat the raw material 5 and melt it before an atomization step 300, is to utilize as the heat source 13 an electric arc between a cathode and an anode. The cooled cathode 6 can be armed with a non-consumable tungsten electrode 23, while the anode can concurrently work as a vibration source, namely a sonotrode 3, which is also able to conduct electricity. Melting takes place on the sonotrode 3, namely in the molten metal pool 21.

In one embodiment "in vacuum", for the purpose of melting the raw material 5 before the ultrasonic atomization step 300 the low voltage electricity (10-40V) is conducted through vapors emanating from molten raw material so as to create the electric arc 13 between the cathode 6 and the anode 3 (sonotrode). The optimum temperature during atomization on the surface of the molten metal pool 21 is around 1.3 times of its melting temperature, however in general the temperature on the surface of the molten metal pool 21 has a temperature equal to or greater than the melting temperature (liquidus) of the heavy metal raw material 5, but below the vaporization temperature of the atomized heavy metal raw material 5 To reach such stable conditions of the temperature and electric arc discharge, the pressure in the chamber 2 is supposed to be reduced to range 0.0001-0.01 barA for heavy metals, particularly noble elements. The best pressure level from above range should be identified for each processed heavy metal composition in following steps:
  a. Select optimal atomization temperature to reach efficient powder output (usually ~1.3 times of meting temperature in deg K);
  b. Check the vapor pressure at above optimal atomization temperature for the molten metal (material property to be found in handbooks);
  c. Set-up the chamber pressure with aid of vacuum pump at level equal to the vapor pressure from previous point.

If the processed raw material 5 is an alloy, similar analysis is to be performed for the most volatile element in the alloy composition, where the calculation should use the partial vapor pressure. E.g. during atomization of gold alloy Au75Ag20Cu5 with melting temperature ~1120 K at vacuum, the optimum atomization temperature is ~1460 K. If the chamber pressure kept at ~100 Pa, the lowest evaporation temperature is obtained for silver (Ag 1575 K, Au 2021 K, Cu 1850 K) and vapors made mostly of silver will keep the electric arc 13 in stable conditions. Of course, the evaporated part of the silver from the composition will be this way lost and deposited on chamber surfaces, what is one of disadvantages of the embodiment "in vacuum".

To summarize, for the embodiment in the "vacuum" with the gas 8' in fact at reduced pressure in range 0.0001-0.01 barA, it is possible to get best balance between vaporization rate needed to stabilize the electric arc and acceptable losses of the raw material 5 due to the same vaporization. In such case the electric arc is to be established in vapors emanating from the molten metal pool 21.

In another embodiment "with gas", for the purpose of melting the raw material 5 before the ultrasonic atomization step 300 the low voltage electricity (10-40V) is conducted through a shield gas 22 (inert in chemical terms), usually argonium, helium or mixture of both, to create the electric arc 13. The length of the electric arc 13 is advantageously in range from 5 to 40 mm between the anode (sonotrode 3) and the cathode (electrode 23). The inert gas above the molted metal pool 21 is the shield gas 22 supplied integrally through the heat source 13 in the form of the cooled cathode 6. However, the gas where the electric arc 13 is hold is also partly diluted with a primary gas 8 (also inert) supplied at an inlet 7 and guided by a feature 12 and flowing along the chamber 2 toward an outlet 10 as shown in FIG. 2A.

In one variant, the DC electric arc 13 is created between a tip 23 of the tungsten electrode 6 (cathode) and a sonotrode 3 midpoint (anode), while the feeder 4 of the raw metal material 5 is electrically neutral. In other variants the electric arc 13 can be created with the use of an alternating current (AC) between the tip 23 of the tungsten electrode 6 and the sonotrode 3 of the same design as in DC version.

Figure 7:
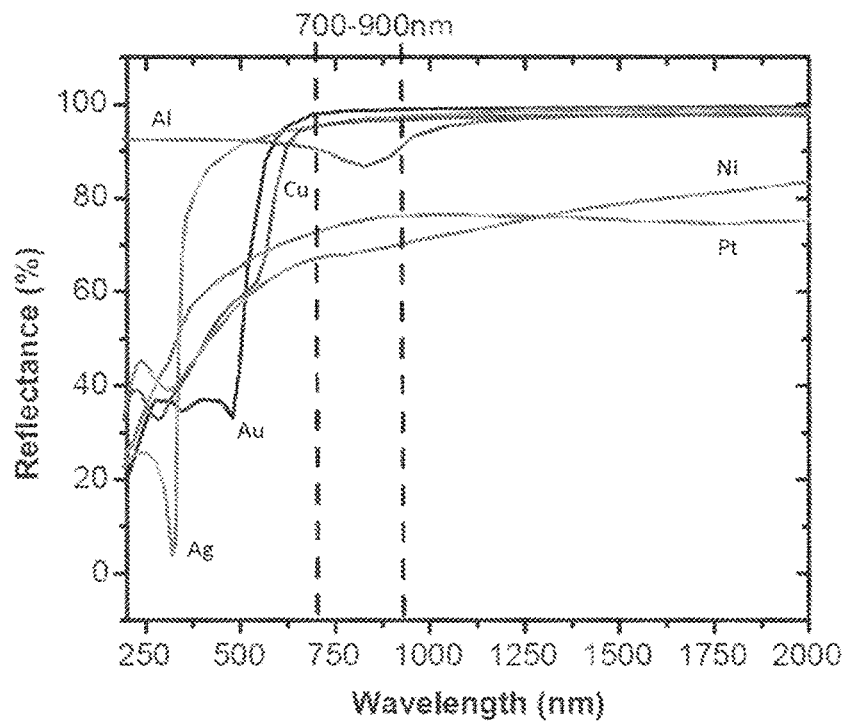
FIG. 7 contains a reflectivity chart for some elements vs. light wavelength.
Figure 8:
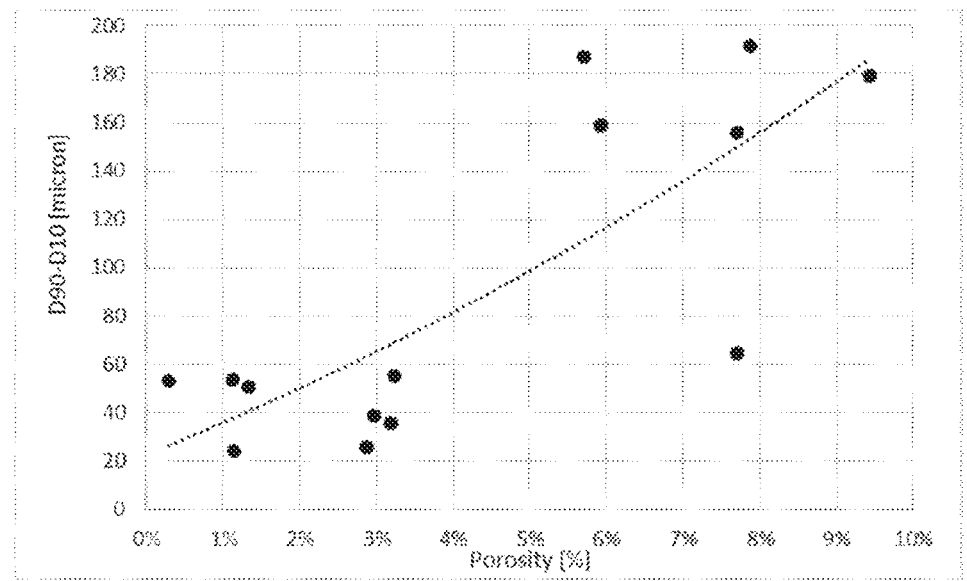
FIG. 8 shows the porosity of 3D printed object made of noble metals in function of powder diameter range.

In the step 200 of melting, several physical phenomena are taken into account, like thermal conductivity, evaporation rate and enthalpy, reflectivity particularly in infrared wavelength and anode effects (polarization, ionization and thermal electron impact), in order to establish suitable process on the surface of the molten metal pool 21. The reflectivity chart for some elements vs. light wavelength is shown in FIG. 7. Doted lines show the dominating range of infrared from the electric arc in the argonium. Those physical phenomena are of the same importance, but of different proportions for "vacuum" or "in the gas" for gas.

A heating system based on the electric arc 13 is preferably used within the method according to the invention. Such heating system based on the electric arc 13 is able to heat up the raw material 5 significantly above its melting point. In general, the temperature on the surface of the molten metal pool 21 has a temperature equal to or greater than the melting temperature (liquidus) of the heavy metal raw material 5, but below the full vaporization temperature of the atomized heavy metal raw material 5. Preferably it is desirable to reach the temperature level of the raw material 5 about 1.3 times its melting temperature expressed in Kelvin degrees. This approach offers important advantages for the atomization step 300, like lower surface tension and viscosity of liquid metal to be atomized, what increases the atomization output and reduces size of droplets 11. The drawback of this approach is visible evaporation of elements with higher vapor pressure (e.g. silver in case of gold alloys). One should also understand, that the surface temperature on the molten metal pool 21 is not uniform, if heated by an electric arc 13. This kind of heating provides highly localized heating, what generates the thermal gradient in the pool 21 reaching 300-500 deg K. Such gradient further increases the evaporation rate as a peak temperature in the center of the molten metal pool 21 can sometimes reach even boiling point.

In case of noble metals, the evaporation is highly undesirable, because of high price of the raw material 5, while material losses due to the evaporation are difficult to be recovered later from the process. E.g. gold during atomization step 300, if overheated to >2000 K, will evaporate with rate reaching few percent of the raw material 5 supply. For this reason, an effective control of the temperature range of the melted raw material 5 within the step 200 of melting is required, both for the embodiment with the vacuum 8' as well for another embodiment with the gas 8. In case of heavy and noble metals, the temperature on the surface of the molten metal pool 21 should be kept at temperature at least of the melting temperature of the heavy raw material 5, but below the vaporization temperature of the atomized heavy metal, preferably in range 1.0-1.3 of their melting temperatures expressed in Kelvin degrees, along with the thermal gradient in the molten metal pool 21 as low as possible. For example, for the platinum with its melting temperature at 2045 K, the temperature on the pool 21 during atomization should reach from 2045 to 2659 deg K or even more to assure process stability and best efficacy.

The evaporation is to be strictly controlled, if the processes takes place in the "vacuum". To reach such stable conditions of the temperature and electric arc discharge, the pressure in the chamber 2 is supposed to be kept to range 0.0001-0.01 barA for heavy metals, particularly noble elements. The best pressure level from above range should be identified for each processed heavy metal composition in following steps:
  a. Select optimal atomization temperature to reach efficient powder output (by default ~1.3 times of meting temperature in deg K);
  b. Check the vapor pressure at above optimal atomization temperature for the molten metal (material property to be found in handbooks);
  c. Set-up the chamber pressure with aid of a vacuum pump at level equal to the vapor pressure from previous point.

Moreover, it should be noticed, that noble metals have the highest thermal conductivity of all known materials. If one compares silver, copper or gold with either stainless steel or Ni—/Ti-based alloys the thermal conductivity is 5-10 times higher for noble metal in its liquid state. Such high thermal conductivity has a detrimental effect on the durability of the sonotrode 3 used in the atomization step 300. The heat losses from the molten metal pool 21 toward the sonotrode 3 causes heating of the sonotrode 3. This is why on one hand the sonotrode 3 needs to be continuous cooled, otherwise it will be overheated and distressed. On the other hand, high thermal conduction results in reduction of overall thermal efficiency of the method and needs to be compensated by higher energy supplied to the heat source 13, namely by higher current rating in the electric arc 13.

This is why, for the embodiment "with gas" the electric power supplied to the heat source 13 to melt the heavy metals as defined above does not need to exceed 10 kW per 1 $cm^2$ of the area of the melting pool 21, in order to allow the production rate up to 1000 ml/hr as well as stabilize thermal and electric conditions on the sonotrode 3 and in the electric arc 13. The minimum electric power supplied to the heat source 13 to melt the heavy metals results from the raw material 5 enthalpy and atomization efficacity for desired output and is adjusted case by case.

For the embodiment "with vacuum" the electric power supplied to the heat source 13 is higher as the raw material 5 has to be molten and partly evaporated, while a latent heat of vaporization is important part of enthalpy for this process. However, the electric power does not need to exceed 15 kW per 1 $cm^2$ of the area of the melting pool 21, in order to allow the production rate up to 1000 ml/hr.

Nevertheless, one should notice, that for the embodiment "with gas" the temperature of the shield gas 22, in the electric arc 13 reaches temperatures in range 10000-30000 deg K along with a gas ionization and electron emission. As result such thermal and electric conditions generate high heat flux toward the molten metal pool 21, mostly in the combined form of the anode effect, infrared radiation and thermal convection induced by flowing the shield gas 22 against the surface of the pool 21.

As a consequence, significant part of the heat from the electric arc 13 is radiated in all directions and heats e.g. the primary gas 8 and the atomization chamber 2 inner surfaces. In other words, most of the thermal energy not transferred to the molten metal pool 21 is lost as emitted toward atomization chamber 2 walls without effect on melting of the raw material 5. In case the shield gas 22 is argonium, the dominant wavelength of thermal radiation from the electric arc 13 is in the range of 700-900 nm, as determined by the spectral lines of the argonium. Most of metals have a low or moderate reflectivity in this range of wavelength and can be easily melted by the electric arc 13 e.g. steel, titanium/cobalt/nickel alloys. But heavy metals, especially noble metals, like gold and silver are highly reflective in all wavelengths (what makes them almost perfect mirrors) with the peak reflectivity in the infrared wavelength, like shown on FIG. 7. Thus, the electric power must be provided continuously to the cathode 6, in order to obtain raw metal material 5 stable melting condition by the electric arc 13.

This is why, in general for the embodiment in the "vacuum" the step 200 of melting heavy metal raw material 5 according to the invention using the electric arc 13 is objectively not highly efficient in terms of energy losses, but it has a lot of advantages in terms of implementation simplicity and equipment maintenance costs.

This is why, in general for the embodiment "with the gas", the step 200 of melting heavy metal raw material 5 according to the invention using the electric arc 13 is objectively not highly efficient in terms of energy losses, but it has a lot advantages in terms of implementation simplicity, low losses of the raw material 5 (due to the negligible evaporation) and small dimensions of the pressurized chamber and maintenance costs.

The similar concerns the embodiment in the "vacuum", however here the phenomenon of evaporation introduced to keep electric arc discharge means some losses of the raw material 5 in production. Hence this method is most suitable for atomization of heavy metal alloys, where material loss is practically limited to most volatile elements (e.g. silver or zinc in gold alloys for jewelry). Also here the vacuum chamber 2' and design of device 1' for heavy metal powders production is more simple (as shown in FIG. 2C), as the primary gas 8 (e.g. argon) is not supplied at normal pressure and is not cooled and filtered, although in the "vacuum" the chamber 2' is much larger.

Yet for the embodiment "with the gas", in another variant of the step 200 of melting heavy metal raw material 5 according to the invention, specific position of the cathode 6 in relation to the sonotrode 3 can increase efficacy of feedstock processing, as more molten metal can be converted in droplets 11 and evacuated with the aid of the primary gas 8. As it can be seen in FIG. 2B and FIG. 3 the cathode 6 is placed not vertically above the molten metal pool 21, but in the plane XY being parallel to the direction of ejection of the droplets 11 and extending through the longitudinal axis Y of the sonotrode 3, the cathode 6 is positioned above the sonotrode 3 and oriented at an angle α equal to 0-40° measured from the axis X being perpendicular to the direction of ejection of the droplets 11. The almost horizontal positions of the cathode 6 offers here the advantage, namely the magnetic fields around the electric arc 13 from the cathode 6 and the cylindrical sonotrode 3 (here also the anode 3) interfere each other, what causes a substantial electric arc blow. This blow (marked as an electric arc deflection in FIG. 3) is useful and desirable, because it stretches the arc 13 (elongate it), what raises the electric potential in the electric arc 13 and augments the heat generation above the molten metal pool 21. Moreover, the arc blow deflects the electric arc 13 in a way, that it enters in the center of sonotrode 3, where the molten metal pool 21 is intended, as well as where the heat flux toward to pool 21 is more uniform. As a consequence, the evaporation of the molted metal is diminished, said evaporation being particularly undesirable for very expensive noble metals.

For the embodiment of the method according to the invention taking place in the "vacuum", the proper position of the cathode 6 versus the sonotrode 3 can increase efficacy of feedstock processing and loss of raw material 5 by avoidance of collision of ejected droplets with a fixture of the cathode. Namely, as shown in FIG. 2C the electrode tip 23 is placed at a distance d from the molten metal pool 21, d comprising between 5 and 30 mm, and is inclined in plane XY defined in FIG. 2C at an angle β (not marked) equal to 90 to 50 deg and comprised between the longitudinal axis Y of the sonotrode 3 (i.e. direction of droplet ejection) and the longitudinal axis of the electrode tip 23, preferably the electrode tip 23 being above the molten metal pool 21.

In the embodiment "with the gas", the best thermal efficiency is usually obtained, if below criteria within this step 200 of melting heavy metal raw material 5 are satisfied all together: power rating of the electric system to generate the electric arc 13 is less than 10 kW/cm^2 of the area of molted metal pool 21, preferably with the current in the electric arc in the range 80 to 350 A, the electric arc 13 length i.e. distance d between the electrode tip 23 and the molten metal pool 21 center is in range 10 to 40 mm, the cathode 6 and the electric arc 13 are above the sonotrode 3 and inclined in plane XY defined in FIG. 2B at an angle β (not marked) equal to 90 to 50 deg and comprised between the longitudinal axis Y of the sonotrode 3 and the longitudinal axis of the electrode tip 23 as shown in FIG. 2B. Such mutual arrangement of those components enables avoiding collision and then adhesion of ejected droplets 11 onto the cathode 6 fixture.

The above thermal efficiency can be defined as proportion of thermal energy received in continuous manner by the heavy metal raw material 5 kept in liquid state to the electric energy provided to the heat source 13. The lowest efficiency is reached for highly reflexive noble metals like silver and gold, and metals of very high melting temperatures, usually >2023 deg K, because of inevitable losses of energy for cooling of critical systems items like the sonotrode 3 and the electrode 6 (the cathode 6), in order to assure their long life.

Advantageously, for the embodiment "with the gas" the above heat transfer in the step 200 of melting the heavy metal raw material 5 by the electric arc 13 can be ameliorated by an augmented convection or change of radiation wavelength between the extremely hot gas in the electric arc 13 and molten metal pool 21.

Preferably, such increased heat transfer by convection or modified radiation can be obtained by selection of the arc shield gas 22 (chemically the inert gas) as a mixture of argonium and helium, where preferably He >10% per volume.

An addition of the helium to the arc shielding gas 22 has several advantages here, namely helium has the dominant spectral lines in range 580-720 nm, hence with wavelength of lower reflexivity (in reference to argonium) for most metals of interest. Moreover, helium electrical properties allow to reach higher electric potential in the electric arc 13. It means that for the same level of current, higher electric energy is transferred through the electric arc 13, what allows to generate much higher heat flux on the same area of the molten metal pool 21 (e.g. ~40% more for mixture Ar70%+He30% vs. pure argonium).

Helium electrical properties, allow to reach higher heat generation in the electric arc 13 due to the fact that the arc voltage is significantly increased by the addition of helium, as it has a higher ionization voltage than argon in the electric arc 13. This tendency is due to the fact that the electric potential in the cathode region clearly increases, when helium is added up to the content 75% of helium. It is also due to the fact that the potential gradient of the arc column and the potential in the anode region remain virtually constant up to a helium content of 75%.

The heat input absorbed in the anode (i.e. sonotrode 3) increases, when helium is added to the argon arc. This tendency is due, not to an increase in the amount of energy transport due to electron flux and anode effect, but to an increase in the energy transport due to more intensive heat conduction and transfer from the plasma rich in helium. As results the heat transferred from the electric arc 13 to the molted metal pool 21 of highly reflexive metals is significantly improved.

The energy loss not absorbed in the cathode 6 collet and anode 3 decreases, when helium is added. This is due to the fact that the radiant energy emitted from the arc column, when helium is added sharply decreases. Moreover, the helium has the dominant spectral lines are in range 580-720 nm, hence with wavelength of lower reflexivity (in reference to argonium) for most metals of interest. This reduces the radiation losses in undesirable infrared wavelengths and means that for same level of current, larger part of electric energy is transferred from the electric arc 13 directly to the molten metal pool 21.

Preferably, the shield gas 22 for the electric arc 13 can be supplied in amount 8 to 30 l/min. Moreover, the shield gas 22 composed of argonium with 10 to 75% addition of helium per volume increases its thermal conductivity above the molten metal pool 21, what helps to melt the raw material 5 as well as modifies the spectral emissivity of the electric arc 13 to lower wavelengths, what is desirable for highly reflexive metals. Preferably said mixture of Ar+He shield gas 22 can be used for melting of copper, silver, gold and their alloys or material with melting temperature >2023 C like platinum, rhodium and iridium.

For the embodiment in the "vacuum", the augmented convection or tuning of radiation wavelength between the ionized shield gas 22 and the molten metal pool 21 is not feasible, so the electric energy conversion to heat is not efficient as "with gas". In practice, the heat to melt/vaporize the raw material 5 is generated mostly by anode effect and partly by radiation of the heat from the electric arc 13 toward the molten metal pool 21. As the electric arc 13 is discharged in the vaporized raw material 5 (emanating from the molten metal pool 21), the vapor density drops with the distance from the molten metal pool 21. For this reason, the electric arc 13 length is shorter in the embodiment in the "vacuum", preferably the electric arc 13 length being 5 to 30 mm. Moreover the ionization energy of the vaporized noble metals (like Au, Pt, Pd, Ag, Cu) is lower by ~45% than of the shield gas 22 (like argon) This results in both effects limiting the electric arc 13 voltage and a force to keep the electric arc being at ~50% higher current rating in comparison with the embodiment "with gas".

Optionally the raw material 5 can be pre-heated by an additional heat source (not shown) to a temperature up to 70% of its melting temperature in Kelvin degrees. This way the demand for electric energy consumption in the main heat source 13, namely the electric arc, can be reduced and overall energy conversion within the method and the device according to the invention improved. A pre-heating is advantageous particularly in case of the raw material 5 of very high melting temperature (>2023 deg K). Such pre-heating allows the cathode 6 to work at lower current rating, what improves its durability and reduces level of contaminants in the final product (droplets 11→powder 11') by slower vaporization of the electrode tip 23. For both embodiments, the additional heat source can be an auxiliary induction heating source, for example a coil installed around the wire in the feeder 4.

For the embodiment "with the gas", the additional heat source can be optionally ventilation of the feeder 4 with a hot secondary gas 15 e.g. recirculated from hot area of the chamber 2 with similar effect as described above.

In another variant of the step 200 of melting heavy metal raw material 5 according to the invention, the DC electric arc 13 is modified by the current pulsations in the range of 50-350 Amp and at low frequency between 20 and 1000 Hz, preferably 50-400 Hz, in order to boost the long capillary waves on the surface of the molten metal pool 21 and intensify mixing of liquid metal and wettability on the interface between the molten metal 21 and the sonotrode 3 center. This DC power modification by current pulsation is advantageous for both embodiments: in the "vacuum" and "with the gas".

Such modification also allows in both embodiments: in the "vacuum" and "with the gas", to improve process efficiency, if the pulsation of the electric arc 13 are synchronized with same frequency pulsation of ultrasonic vibrations in the sonotrode 3 during the step 300. Namely less energy must be supplied by the ultrasonic transducer (not shown on figures) to reach atomization threshold in the molted metal pool 21. Moreover during phase when the electric arc 13 is decreased, the Lorenz forces acting on electrically charged droplets 11 (ejected from the anode 3) are the lowest, what diminishes electric losses in electromagnetic field around the electric arc 13 and the sonotrode 3 at the beginning of the step 400, hence improves overall energy conversion from supplied electricity to the device 1 vs. enthalpy and kinetic energy of droplets 11 of atomized heavy metal.

In other words, a low frequency pulsation in range of 20 to 1000 Hz, more preferably 50 to 400 Hz, helps as follow: in case of DC electric arc pulsation, it generates long capillary waves on the surface of the molten metal pool 21 and intensify mixing of liquid metal as well as reduces the thermal gradient in the molten metal pool 21. Such mixing uniforms the temperature on the surface of the molten metal pool 21 and helps to better control the evaporation rate in the point, where the electric arc 13 is directed (the electric arc temperatures 10000-15000 K above the surface of the pool 21).

Additionally, for the DC electric arc 13 during pulsation cycle, when the current is low, the electromagnetic field around the electric arc 13 is also low, hence the Lorenz force weakens initial deflection (scatter) of droplets trajectories is mitigated.

In case of oscillation of power on the ultrasonic transducer, it reduces the average heat generated inside their piezoelectric items, what reduces its working temperature and allows to operate during part of the pulsation cycle on higher power rating. As the atomization intensity on the molten metal pool 21 is non-linear function of vibration intensity, even short time increase of vibration amplitude can boost the atomization.

Preferably both pulsations on DC electric arc 13 and ultrasonic transducer can be synchronized the way, the peak level of electric arc 13 occurs concurrently with low power consumption on the transducer. In this phase taking 10 to 40% of the pulsation cycle time, most active is heating action with reduced atomization, hence the current should be in range 150-350 amp. Then the revers action should take place during 60 to 90% of the cycle time, when the atomization is maximized and heating diminished with the current in the range 50-150 A.

Yet for both embodiments, namely in the "vacuum" as well "with the gas", in another variant of the step 200 of melting heavy metal raw material 5 according to the invention, the electric arc 13 can be of AC type in the range of 80-350 A at a frequency between 100 and 50000 Hz, preferably at a frequency in the range of 5 to 50% of ultrasonic frequency of the sonotrode 3, more preferably at one of fraction $1/10$, $1/5$, ..., $1/4$ or $1/3$ of the ultrasonic frequency at the sonotrode 3 as in the step 300. This way the AC electric arc 13 generates the secondary capillary waves of sub-synchronous frequency on the molten metal pool 21 surface and enhance the instability of the capillary waves at frequency driven by the sonotrode 3 as well as improves wettability of interface between the molten metal pool 21 and the surface of the sonotrode 3. As result a threshold of atomization for required sonotrode 3 vibrations is lowered and the entire process can be continued with lower electric energy consumption.

Further step of the method for production of heavy metals according to the invention is a step 300 of the ultrasonic atomization. This step involves providing mechanic vibrations to the molten metal pool 21, so as to cause the heavy metals droplets being ejected from the molten metal pool 21. Within this step the capillary waves generated in the liquid metal pool 21 are utilized. Said capillary waves are generated by the ultrasonic vibrations from the transducer (not shown) attached to the cold end of the sonotrode 3. In this way the pool 21 of molten raw material 5 is subjected at its bottom to vibrations coming from the sonotrode 3. To effectively transfer these vibrations (i.e. at minimum material damping and ultrasonic wave reflection between dissimilar materials), the interface of the liquid metal pool 21 and sonotrode 3 surface has to assure high wettability. Said step 300 of ultrasonic atomization comprises ejecting droplets 11 of molten heavy metal from a hot end of said sonotrode 3, if the vibrations exceed a critical value specific for the molten metal at given temperature. This condition is meant as atomization threshold and can be lowered (i.e. liquid metal is more prone to atomization) by reduction of its viscosity, what is visibly correlated with the molten metal pool 21 temperature. As already mentioned, in practice the surface of the molten metal pool 21 have to reach temperature around 1.3 melting temperature (liquidus) in deg Kelvin or even higher, in order to reduce the metal viscosity appropriately. However, in case of some metals (e.g. silver and alloys with more volatile elements) uncontrolled overheating can accelerate their evaporation, because of high vapor pressure at higher temperature.

In general, any ultrasonic atomization ejects droplets 11 of stable diameter (D50 by default) with a rate proportional to ultrasonic vibrations (meant as number of oscillation cycles in a time frame). Therefore, the production output of the system is usually defined as a volumetric rate (e.g. ml/hr) as multiplication of droplet 11 ejections number and their size expressed by a droplet volume (assuming that a droplet 11 is spherical). Such output parameter is specific for a given atomization device, which is usually versatile to atomize different metals.

It should be emphasized that for heavy metals with much higher density (i.e. in the range from 8500 to 22590 kg/m^3), even if their heavy powders are produced on similar volumetric rate as common steel, the mass of produced powder can increase considerably up to 2,8 times in comparison with other standard metals like steel. This means that all device parameters might require significant upgrade depending on the heavy metal to be atomized.

All parameters relating to product mass rate like: thermal energy (enthalpy) to melt the raw material 5, kinetic energy for ejection of droplets 11, droplets' cooling rate to solidify, mass inertia determining droplets trajectory and velocity and efficiency of powder separation system, all of them require energy to proceed, hence more heavy powders require more input energy (electricity in most general terms) to reach satisfactory level of volumetric rate production.

As mentioned earlier, parameters of the ultrasonic atomization step 300, like the power provided to the heat source 13 and the ultrasonic transducer on the sonotrode 3 as well as the transducer frequency can be adjusted so as to melt and atomize elements and alloys of density of at least 8500 kg/m^3 and melting temperature of at least 1073 deg K (liquidus), preferably gold, silver, copper, platinum, palladium, iridium, ruthenium, rhodium, uranium, osmium, tantalum, hafnium and their alloys of the content >40% per weight, if they meet stated limits for density and melting temperature.

Namely, the power rating of the ultrasonic transducer, which generates vibrations in the sonotrode 3 and then in the molten metal pool 21 is at least 30 W/cm^2 of the area of the molten metal pool 21 and the transducer frequency is continuously or periodically kept at any setpoint in the range from 15 to 1000 kHz. This is true for both embodiments, namely in the "vacuum" as well for "with the gas", because the surface tension of molten metal is almost same at pressures in range 0-6 barA.

Moreover the amplitude of the vibration velocity on the sonotrode 3 hot end is at least 0.2 m/sec 0-peak, in order to eject the droplets 11 of diameters up to 100 microns on the altitude in range 20 and 400 mm above the molten metal pool 21, if its density meet the density and melting temperature criteria as stated in the previous paragraph.

Additionally, for the embodiment "with the gas", the ultrasonic vibrations as above can provide a secondary advantage due to the fact, that shaking of the molten metal pool 21 as provided by ultrasonic vibration allow to improve heat transfer between the pool 21 and the electric arc 13 in reference to non-vibration case.

For the embodiment "with the gas", shaking the molten metal pool 21 by ultrasonic vibration can be utilized to boost the thermal convection between the molten metal pool 21 and the hot (shield) gas 22 in the electric arc 13, hence improve overall heat transfer from the gas to the molten metal pool 21, if the conventional means, like based on radiation are not effective enough—as in case of noble metals of high reflexivity.

Next step of the method for production of heavy metal powders is a step 400 of directing and transporting heavy metal droplets 11 outside the molten metal pool 21 along with their cooling down, so as their temperature decreases below 70% of their melting temperature in degrees Kelvin before the metal droplets 11 reach (collide) any surface. The directing and transporting of heavy metal droplets 11 is performed in a controlled manner both for the embodiment "in vacuum" as well "with gas".

Regarding cooling process, the heat (enthalpy) from the droplets 11/powder 11' is taken away during their freely cooling down by radiation (both in "vacuum" and "with gas") and convection ("with gas" only). Hereinafter the term 'freely' means that the droplets 11 cool down before they reach any surface. More heat can be taken away by gas, particularly at elevated pressure (>1 barA). In case of the method performed in vacuum, the heat is to be radiated out to the chamber walls and then to the ambience. Hence additional cooling action directed to the chamber wall is required for the embodiment with the vacuum. Such cooling action is optional for the embodiment with the pressurized chamber 2.

In case of the embodiment "with the gas" a controlled directing and transporting of the metal droplets 11 is controlled by following: vector of initial kinetic energy (provided by the ultrasonic vibrations on the sonotrode 3), Lorenz forces driven by the electromagnetic field in vicinity of the electric arc 13, gravity acceleration, aerodynamic drag and viscosity forces of the gas 8 acting on the droplets 11. The last two forces related to the gas 8 can be intensified, if the gas 8 is provided at higher pressure (e.g. >1 barA), what allows to shorten cooling time and the trajectory for droplets 11 between the sonotrode 3 and the chamber outlet 10, if the compact size of the device 1 is needed. In other words, in the embodiment "with the gas" directing the ejected heavy metal droplets 11 involves additionally intercepting them by a controlled stream of the gas 8.

For the embodiment in the "vacuum", the same forces act on the droplets 11 except aerodynamic drag and viscosity forces of the gas 8', which are negligible, if gas pressure is below 0.01 barA. As a consequence, the droplets cooling time and the trajectory are about 3 times longer than "with the gas", hence the vacuum chamber 2 should be of much larger dimensions and volume than the chamber 2 pressurized with gas.

For the embodiment "with the gas" a controlled directing and transporting of the metal droplets 11 is carried out with the use of a cold primary gas 8, preferably mixed with much smaller amount of the shield gas 22 departing the cathode 6. The heavy metal droplets 11 ejected during the atomization step 300 should leave the molten metal pool 21 in a specific direction, preferably vertical one, otherwise the droplets of high initial velocity or of larger diameters (more close to D90) are likely to hit the walls of the chamber 2 (which is small) in a random manner forming deposits there and causing material losses.

Thus, the metal droplets 11 are entrained by the cold primary gas 8 within the chamber 2, so as to control their trajectories and cool down below their melting temperature, hence changing its state to solid one and form a powder 11'. According to the invention, the flow of the primary gas 8 is guided first upstream of the sonotrode 3. Then, the flow of the primary gas 8 combines with the flow of the shield gases 22 in the vicinity of the heat source 13, and together is directed above and downstream of the sonotrode 3, where a part of the heat in the shield gas 22 exiting the electric arc 13 is diluted by the primary 8 and optionally secondary 15 gases. The flow direction of combined streams of the primary gas 8 and the shield gas 22 is shown on FIG. 3. In particular, it is shown the primary gas 8 flow and the shield gas 22 flow (gray arrows) around the sonotrode 3 and the heater 13. Dotted line in FIG. 3 marks an electric arc 13 under the blow from magnetic field.

For the embodiment "with the gas", preferably, as mentioned earlier, the primary gas 8 and the shield 22 gas can be argon or a mixture of argon with helium. Preferably the shield gas 22 has higher helium content, then the primary gas 8. In basic variant a mixture of argon and helium is supplied to the chamber 2 at temperature below 150 C, more preferably below 50 C by at least one gas inlet 7. The volumetric inflow of these gases is based on simulation of droplets trajectories and their cooling time for demanded droplets diameters range (from D10 to D90) and mass. However, in general the volumetric inflow of the inert primary gas 8 should be preferably of the average velocity >0.5 m/s in part of the chamber 2, where the droplets flow is anticipated i.e. downstream of the sonotrode 3. In case of atomization of powders 11' of very high melting temperature (>2023 deg K) or at high atomization rate, the gases 8, 22 can be supplied at elevated pressure (>1 barA) to take advantage of their higher volumetric heat capacity to enhance cooling of heavy metals with high level of enthalpy. This also allows to keep compact size of the system (chamber, separation unit, piping, cooling unit) for scaled up output, if required.

Figure 3:
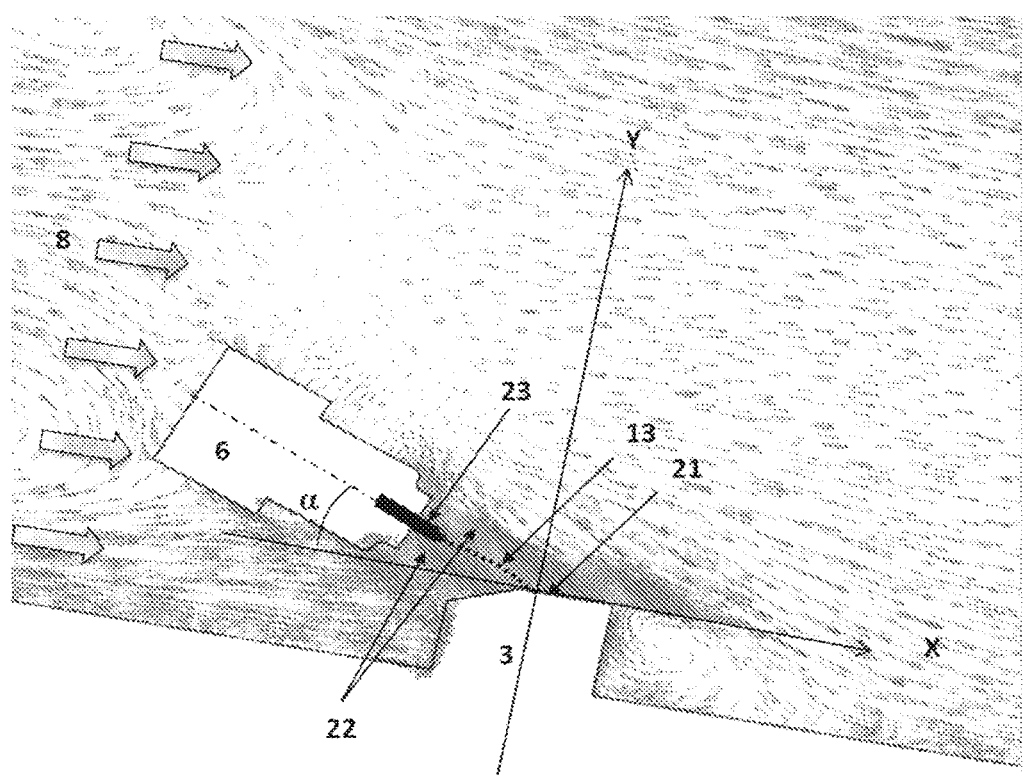
FIG. 3 shows a gas flow for primary and shield gases around the sonotrode and the heater.

As shown in FIG. 3, the stream of the primary gas 8 is guided within the chamber 2 in a controlled manner. According to the invention, the step 400 of directing and transporting heavy metal droplets 11 comprises keeping the gas flow parallel to a major axis (not marked) of the chamber 2 at specific velocity threshold which is >0.25 m/sec, preferably >0.5 m/s, measured as average value across the plane perpendicular to the major (longitudinal) axis of the chamber 2. In such conditions, heavy metal droplets 11 deflect their trajectories with the aid of the aerodynamic drag forces.

Yet for the embodiment with the gas, the flow distribution of the incoming primary gas 8 in the chamber 2 can be preferably obtained by designing specific means in each part of the chamber 2 (see FIG. 2A), for example by designing at least one gas inlet 7 port with help of CFD modeling, and/or providing guiding means like at least one deflector 12 and/or providing an inflow of a secondary hot gas 15 from at least one other hot gas inlet port 14 than the primary gas inlet 7.

As mentioned earlier, the cooling function in step 400 of transporting heavy metals droplets 11 can be optionally augmented for the embodiment "with the gas" and in the "vacuum", if the side walls of the chamber 2, 2' and the converging outlet 9 of the outlet port 10, for example in the form of a channel, are additionally cooled, e.g. with a water jacket or external chamber radiators 24 (as shown in FIG. 2c), to dissipate more heat by radiation and convection to ambience.

Yet for the embodiment "with the gas", next step of the method according to the invention is a step 500 of separation of the heavy metal powder from the combined gas streams of the primary gas 8 and the shield gas 22, as well as optionally hot secondary gas 15 and then regeneration of the gas mixture (8, 22, 15). First, the separation can utilize means like separation on a cyclone or filtration or both together. Preferably the stream of the powder 11' moved by the warm gas mixture (8, 22, 15), which usually has temperature 343-473 deg K as at the end of the step 400, is directed to the cyclone (not shown). The cyclone performs selection of particles of the heavy metal powder 11' from low density gas mixture (8, 22, 15) through the vortex separation.

For the embodiment in the "vacuum", there is no need to separate the heavy metal powder 11' from the gas 8', thus the powder 11' is eventually falling down by gravity to a container (not shown in FIG. 2C) placed at an outlet port 10 under a converging outlet 9.

For the embodiment "with the gas", the heavy metal powder 11' is collected, as final product of the method according to the invention, in a container (not shown in FIG. 2A) on the cyclone bottom, while the combined inert gases (mixture 8, 22, 15) with small particles (i.e. dust of diameter below D10 for product) is departing from the cyclone on its top. Then the inert gas mixture (8, 22,15) can be filtered out of dust, so that to receive again clean inert gas 8, 22,15. Then the combined inert gas is recycled after external cooling back to the process in step 300 as the cold primary gas 8.

Moreover, the droplets 11 of expensive noble metal, which reach accidentally the surface of the chamber 2, can be retrieved after the device 1 is shut down. The powder 11' collected on the inner surfaces of the chamber 2 can be manually scraped (e.g. by brush). For the industrial applications of higher output, it is possible also to cover the inner surface of the chamber 2 with soft porous ceramic coatings resistant to elevated temperature (e.g. based on $Al_2O_3$, $SiO_2$, $ZrO_2$ and others). The noble metal dust or deposited vapors accumulated on such coating can be removed occasionally with chemical means (e.g. acids) along with said coating. Then coating is reapplied.

Due to the utilization of the ultrasonic vibrations to excite the capillary waves in the molten metal pool 21 (step 300) and then provision of controlled transporting of the heavy metal droplets 11 from the molten metal pool 21 along with their cooling (step 400), the powder 11' received in the step 500 (i.e. final product of the method) meets all together criteria, before classification on separate sieve, as follow:
 a. Particle statistical distribution (PSD) in range D90<100 micron and D10 >5 micron,
 b. Span meant as (D90-D10)/D50<1.0, and preferably <0.8,
 c. Average Sphericity meant as Dmin/Dmax at least 0.9.

Another advantages of the method according to the invention are:
 Cleanness—the produced powder 11' as received in the step 500 has no more than 500 ppm other contaminants by weight, then present in the raw material 5,
 Efficient raw material utilization of precious metals—at least 95% of the raw material 5 (per weight) can be received after the process either in the form of collected powder or particles accumulated in the chamber 2 or particles separated between the chamber 2 and the powder container. The person skilled in the art will know the reasons, why the raw material 5 losses came from, namely, that the material, although molted, is never entirely transported as the final product in the form of the powder 11' to the powder container, because the material, mostly fine powder 11' and dust, can be accumulated on the surfaces of the chamber 2 either due to the molten metal splash during atomization malfunction or undesirable evaporation out of the molten metal pool
 Preferably at least 80% of the raw material 5 is collected after the process as the final product in the form of the powder 11' in the powder container, downstream of the chamber 2 and the separation unit (not shown), at conditions for PSD, Span, Sphericity and Cleanness as mentioned above.

Considering the above challenges specific for heavy metals, particularly noble elements, this invention proposes several specialized approaches. One should notice that all disclosed embodiments can be combined in different variants to reach the best effect in terms of energy efficiency, raw material utilization, control of powder diameter range and virtually elimination of subsequent classification.

The device 1 dedicated to production of the heavy metal powders by the ultrasound atomization in the embodiment with the gas, namely the ultrasonic atomizer 1 suitable to produce the heavy metal powders according to present invention such as platinum, silver, palladium, gold, copper alloy has been designed and tested by the Applicant. Aspects of the installation example for the embodiment with gas is shown in FIGS. 2A,2B, 3, 5 and 6A. In particular FIG. 2B is a sectional view along plane AA in FIG. 2A.

Figure 6A:
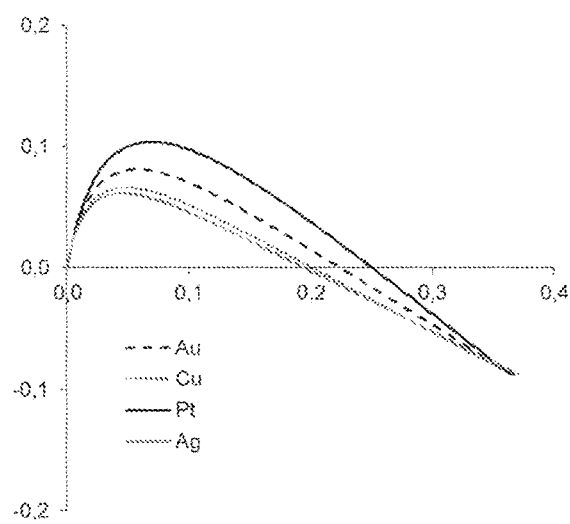
FIG. 6A. shows on the plot a simulated trajectory of the droplets and then the powder for four different metals according to the embodiment with the gas.

The device 1 was equipped with the cooled sonotrode 3 sized to generate vibrations at 35 kHz and can be easily upgraded to other frequencies on request, in order to produce powder of other D50. The primary gas 8 and the shield gas 22 were both argon and delivered to the chamber 2 at temperature 293 deg K. The cathode 6 was a non-consumable tungsten electrode 6 which had a diameter of 3 mm and was generating electric arc 13 of rating in range 1200 to 8200 W to melt the above mentioned metals. The area of the molten metal pool 21 was 110 to 180 mm$^2$ for different versions of the sonotrode 3. The example of trajectories of droplets 11/the powder 11' for few metals is shown in FIG. 6A.

The atomization chamber 2 is substantially longer in a direction perpendicular to the direction of the ejection of droplets 11 from the sonotrode 3 (i.e the longitudinal axis of the sonotrode within the plane AA as shown in FIG. 2A), while overall assembly of the chamber 2 is tilted down by 10 deg as shown also in FIG. 2A and the sonotrode 3 is in general oriented vertically up or tilted by same angle (as shown also in FIG. 2A). The length and diameter (or at least height) of the chamber 2 are selected after a simulation of trajectory of droplets 11 by CFD models. These trajectories are dependent on:

- Droplet 11 material, mostly its density in liquid form,
- Diameter of droplets 11 representing their distribution in range at least from D10 to D90,
- Initial velocity and angle of ejected droplets 11 (i.e. velocity vector from the surface of the molten metal pool 21) as well as their masses (based on diameters) to calculate their initial kinetic energy,
- Droplet 11 initial temperature (no less than melting temperature) and its enthalpy,
- Velocity, mass flow and temperature distribution of the primary gas entraining the droplets 11,
- Density, viscosity and other parameters of the primary gas 8 in function of its temperature.

The initial velocity of the droplets 11 ejected from the sonotrode 3 is comparable to the velocity amplitude $V_s$ of sonotrode 3 hot surface, where the droplets 11 are formed by capillary waves on the surface of the molten metal pool 21. The experiments of the Applicant on heavy metals showed that the vibration velocity of sonotrode 3 hot end should be no less than $V_s$=0.2 m/s to eject droplets 11, what is a preferably value to reach atomization threshold, this velocity can be calculated from the formula:

$$V_s = 2 \cdot \pi \cdot f \cdot U_s$$

where: f—means sonotrode 3 frequency in Hertz, $U_{s\_}$ is the amplitude on the sonotrode 3 hot end in meters. Considering the mass of metal in the molted pool 21 as well as material damping into the sonotrode 3 and on interface between the sonotrode 3 and the molten metal pool 21, the power to reach above threshold of vibration velocity in case of heavy metal requires, that the ultrasonic transducer has a rating at least 30 W/cm$^2$ of the pool 21 area as based on practical observations of the Applicant.

Figure 5:
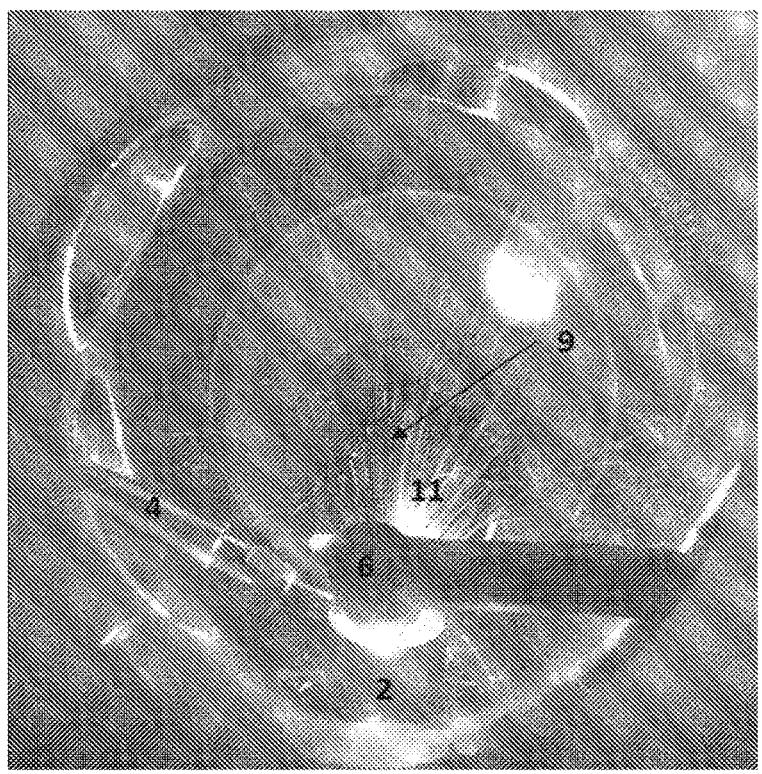
FIG. 5 is a view from the primary gas inlet on the chamber during the process on platinum as in example 2.

The chamber 2 has the primary gas inlet 7 on its one (cold) end, and on the opposite a converging (tapered) outlet 10 of the hot gas—powder mixture, joined to the powder and gas separating device, preferably a cyclone, where the product i.e. powder of desirable particle size is collected, while the recovered gas is cleaned by a filtration, then cooled and eventually recirculated to the primary gas inlet 7. The primary gas inlet 7 is extended with a deflector feature 12, which is used to distribute clean and pre-cooled primary gas 8 along the chamber 2. Streamlines of the primary gas 8 are substantially perpendicular to the ejection direction of molten metal 21 from the sonotrode 3, in order to reject the heat emitted from the region of the electric arc 13. The electric arc 13 is generated by the electrode 6, which is preferably equipped with a non-consumable tungsten electrode tip 23. The sonotrode 3 here is an anode and the electrode 6 a cathode. The raw material 5 is delivered to the molten metal pool 21 in the form of wire through the feeder 4. An exemplary photo of the inside of the chamber 2 during the atomization process according to the invention is shown in FIG. 5. On the left it can be seen the wire feeder 4, on the right the cathode 6 while bright spots in the center are the Pt droplets 11.

The function of the deflector feature 12 is to uniform the primary gas 8 flow profile around the sonotrode 3 and the cathode 6, what reduces turbulence and temperature above the molten metal pool 21, stabilizes the atomization process and helps maintain the desired temperature in the molten metal pool 21. Shown on the plot in FIG. 6A is the practical minimum distance [meters] from an ejection point to meet temperature criteria <70% of the melting temperature in Kelvin degrees in order to avoid sticking of droplets 11 and/or the powder 11' to the surfaces of the chamber 2.

In practice the chamber 2 is configured so as to have the smallest possible dimensions. The smallest as possible volume of the chamber reduces the amount of the inert gas from all streams (primary, secondary and shield) in the system and reduces the start-up time necessary to exchange the atmosphere from air to clean inert gas (i.e. oxygen free). The chamber 2 is universal for various metals and their alloys—by choosing the amplitude on the sonotrode 3 and primary gas velocity profiles (optionally their temperature and pressure), one can simply control the droplet/powder trajectory in the density range from medium (like 8500 kg/m^3 for copper) to very heavy (like 21450 kg/m^3 for platinum).

Figure 4:
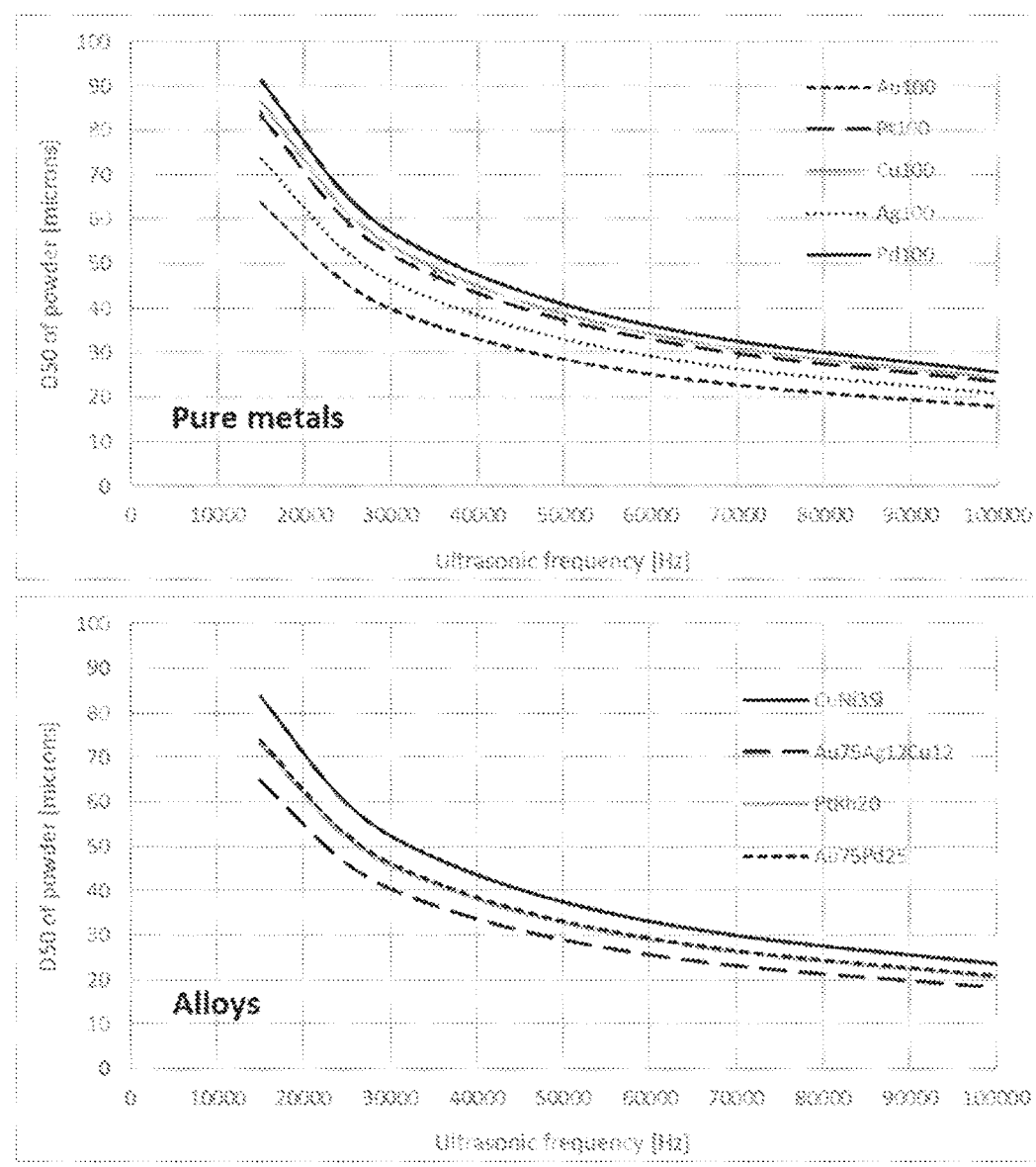
FIG. 4 shows 2 charts with the powder dimeter of different heavy metals and their alloys in function of ultrasonic frequency on the sonotrode.

Moreover, as shown in FIG. 4 parameters of the received heavy metal powder can be modified easily by choosing ultrasonic frequency, thus the method and the device according to the invention can be adjusted to the user requirements. Charts in FIG. 4 show examples of the powder dimeter range in function of ultrasonic frequency on the sonotrode 3 for: on top—pure metals, on bottom—alloys.

Figure 6B:
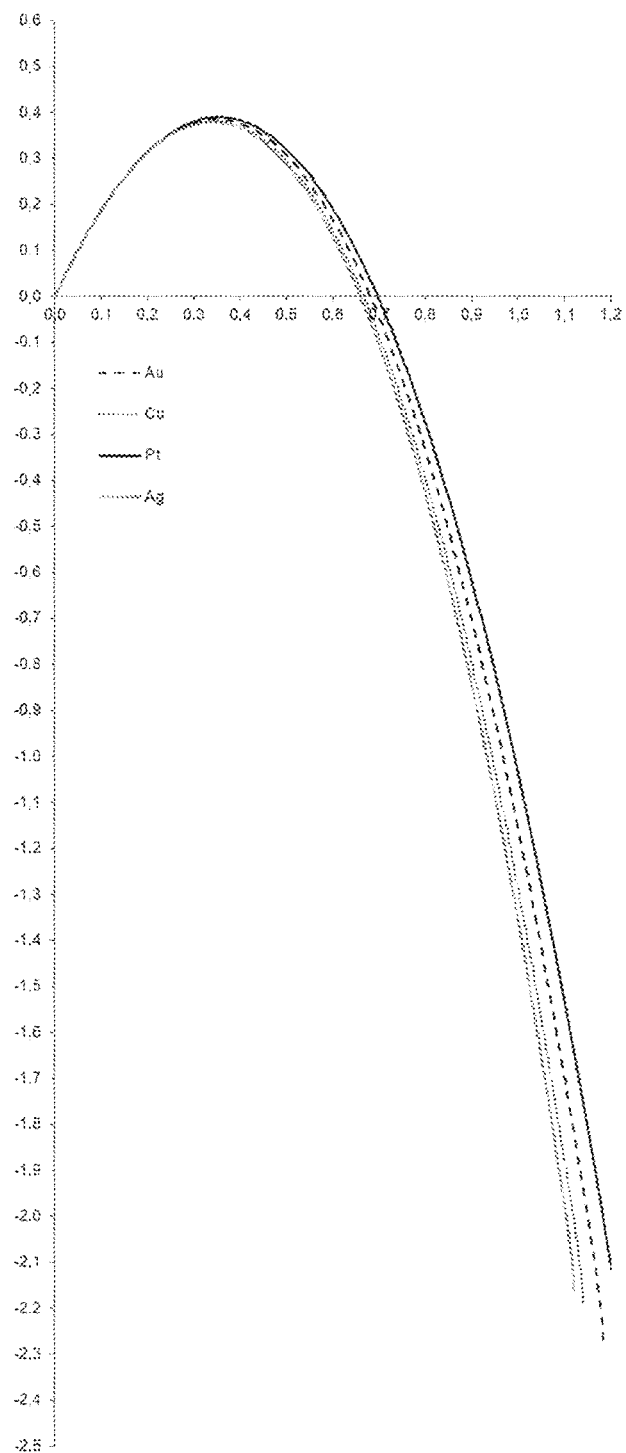
FIG. 6B shows on the plot a simulated trajectory of the droplets and then the powder for four different metals according to the embodiment with the vacuum.

Aspects of the installation example in the "vacuum" is shown in FIG. 2C. The device 1' for the embodiment in the "vacuum" is the simplest, but the chamber 2 itself requires larger dimensions. The same reference numbers are used to indicate the same elements of the device 1' as shown in FIGS. 2A and 2B, which refer to the device 1. The walls of the vacuum chamber 2' require some external cooling features 24, like radiator or water jacket. Such features are optionally for the pressurized chamber 2 as shown in FIG. 2A and FIG. 2B. Moreover, shown on the plot in FIG. 6B is the practical minimum distance [meters] from an ejection point to meet temperature criteria <70% of the melting temperature in Kelvin degrees in order to avoid sticking of droplets 11 and/or the powder 11' to the chamber surfaces at same process conditions as assumed in FIG. 6A. As it can be seen from comparison of plots in FIG. 6B and FIG. 6C, trajectories in the vacuum chamber must be much longer (about 4 times more, than in gas at pressure 1 barA) in order to properly cool down the droplets below the above temperature limit. This explains, why the overall dimension of the "vacuum" chamber 2 are several times larger than the "pressurized" chamber 2.

The person skilled in the art will know that the device for production of heavy metal powders by ultrasonic atomization as shown in one embodiment in FIG. 2A and in another embodiment in FIG. 2C comprises adjusting means responsible for process parameters, namely at least one processor and at least one memory (not shown) which are configured, namely perform instructions of computer program, to adjust different parameters of all configurable components, including feeding means (4), the heat source (13) and the sonotrode (3). The adjusting means controls among others the feeding means (4), the heat source (13), the sonotrode (3), so as to direct the ejected heavy metal droplets (11) away from the molten metal pool (21), so as the heavy metal droplets (11) freely cool down at least by radiation within a predetermined distance and transform to a heavy metal powder (11'). In one embodiment the adjusting means controls also the gas flow rate by transmitting control signals to appropriate components as described earlier.

To summarize, different heavy metals and their alloys can be atomized using single device, due to the fact that all of them are produced with similar volumetric rate and the same type of the cathode 6 and the sonotrode 3. There are just required minor modifications of process parameters like heating rate and primary gas flow rate (both because of differences in melting temperatures and densities) to proceed with new material. Of course, it also requires changing of the sonotrode 3, which is already contaminated by a previous material, and cleaning of the chamber 2, but in total the device can be adjusted in no more than 4 hours.

Example 1

The powders made of the pure platinum (99.9%) and the copper alloy CuNi3Si have been produced by the ultrasonic atomization method according to the invention at frequency 35 kHz in the gas. Both metals represent wide spectrum of materials as covered by claims:

Pure platinum has the very high density 21450 kg/m^3, high melting temperature 2045 deg K and moderate level of reflexivity at infrared wavelengths, Copper alloy CuNi3Si has moderate density 8800 kg/m^3, moderate melting temperature 1348 deg K and very high reflexivity at infrared wavelengths.

Figure 9:
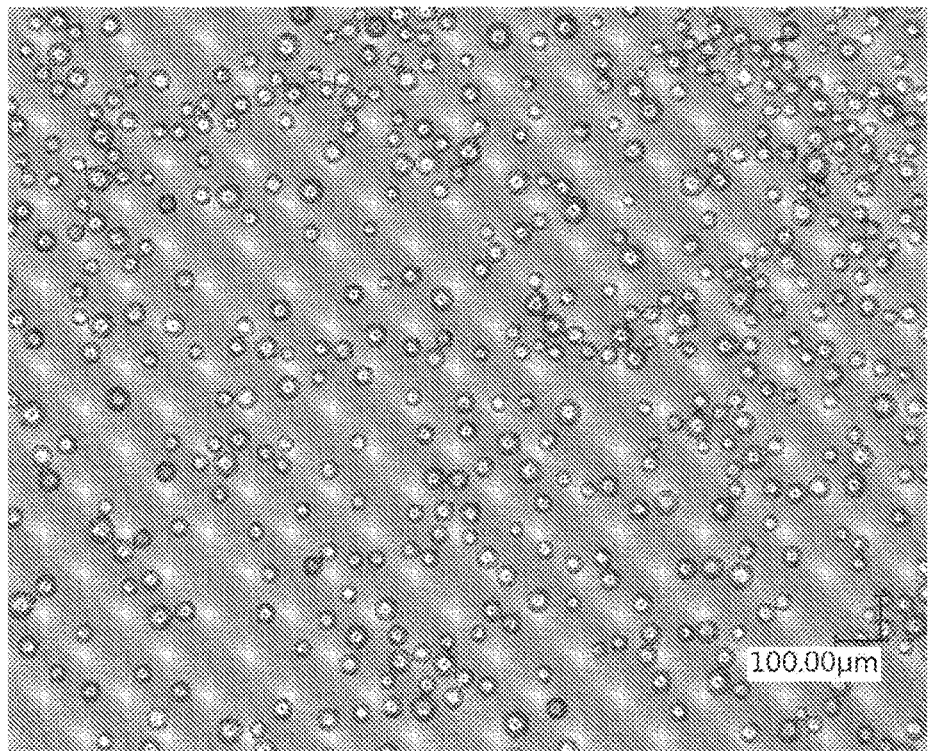
FIG. 9 shows a chart with the example of the Pt powder produced as in Example 2 according to the invention.
Figure 10:
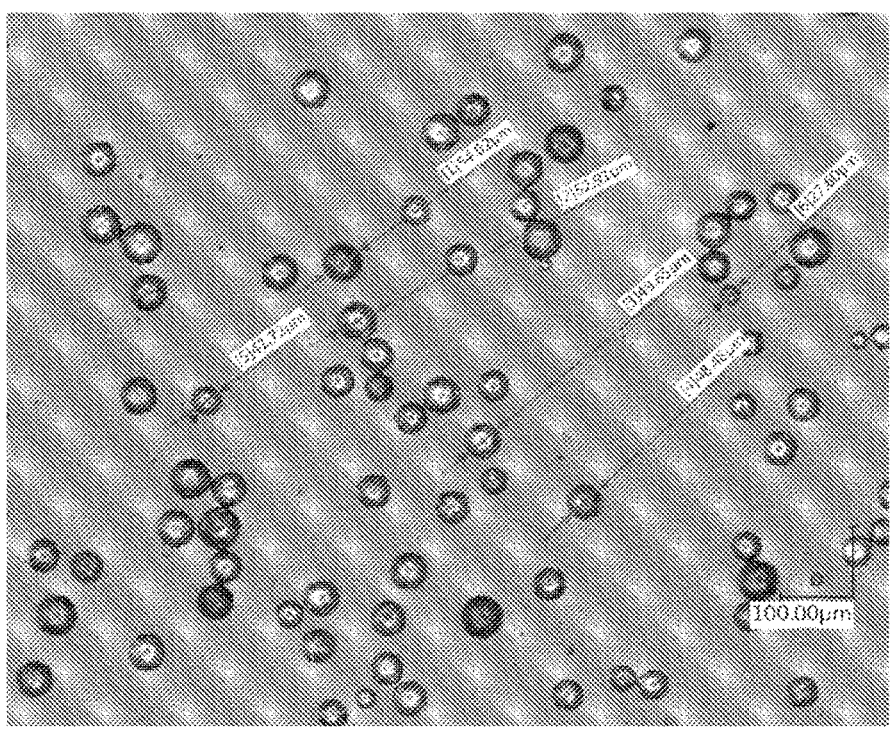
FIG. 10 shows a chart with the example of the CuNi3Si powder produced as in Example 2 according to the invention.

Such powders have been produced on the device 1 as described earlier for the embodiment 'with gas'. Then, without any prior classification, their statistical distributions were examined on the KEYENCE VHX-6000 microscope. The particle size distribution of the powder was measured by the Heywood's method. The photos of the particles in microscopic view for powders are shown on FIG. 9 and FIG. 10. The properties of the powders are in the Table 2 as below

TABLE 2

PSD and Sphericity for the platinum and copper alloy powders after atomization at 35 kHz without further classification.

| | Metal | Pt | CuNi3Si |
|---|---|---|---|
| PSD [microns] | D10 | 39.5 | 34.5 |
| | D50 | 48.3 | 47.6 |
| | D90 | 59.4 | 72.2 |
| | D10/D50 | 0.82 | 0.72 |
| | D90/D10 | 1.23 | 1.52 |
| | Span = (D90-D10)/D50 | 0.412 | 0.792 |
| Sphericity = Dmin/Dmax | Median (50% probability) | 0.94 | 0.93 |
| | At upper 80% probability | 0.95 | 0.95 |
| | % of grains in range 0.8-1.0 | 100.0% | 91.0% |

LIST OF REFERENCE NUMBERS

1 device for heavy metal powders production in the embodiment "with gas"
1' device for heavy metal powders production in the embodiment in the "vacuum"
2 atomization chamber (embodiment "with gas")
2' atomization vacuum chamber (embodiment in the "vacuum")
3 sonotrode (anode)
4 raw material feeder
5 raw material (e.g. wire, rod)
6 electrode/cathode fixture (optionally with the cold shield gas supply)
7 primary gas inlet
8 pressurized primary gas
8' negative pressure gas-vacuum
9 converging outlet
10 outlet port
11 Droplets
11' Powder
12 deflector feature
13 heat source/electric arc
14 hot secondary gas supply/inlet
15 hot secondary gas
21 molten metal pool
22 shield gas
23 tip of a non-consumable tungsten electrode
24 chamber external cooling

The invention claimed is:

1. A method for production of heavy metal powders by ultrasonic atomization, wherein heavy metal is defined as any electrically conductive metal of density >8500 kg/m³ and melting temperature (liquidus) >1073 deg K=800 C at 1 barA, the method comprising:
- providing a heavy metal raw material in the vicinity of a heat source, the heat source having an electrode, and generating an electric arc,
- heating the heavy metal raw material by the electric arc, so as to create a molten metal pool on a sonotrode, the molten metal pool having a temperature equal to or greater than the melting temperature of the heavy metal raw material, but below the vaporization temperature of the heavy metal raw material,
- providing ultrasonic mechanic vibrations by the sonotrode to the molten metal pool, so as to cause heavy metal droplets to be ejected from the molten metal pool,
- directing the ejected heavy metal droplets away from the molten metal pool, so as to cause the heavy metal droplets to freely cool down at least by radiation within a predetermined distance and transform to a heavy metal powder,
- collecting the heavy metal powder,
- the electrode being a cathode and the sonotrode being an anode, the electric arc being of the length in the range from 5 to 40 mm, the electric arc length being measured between a tip of the cathode and the sonotrode center, the power supplied to the electric arc does not exceed 15 KW per 1 cm$^2$ of the area of the molten metal pool, the ultrasonic mechanical vibrations velocity on a hot end of the sonotrode being at least 0.2 m/sec 0-peak in frequency range 15 to 1000 kHz, so as to collect at least 75% of the heavy metal raw material in the form of the heavy metal powder.

2. The method according to claim 1, wherein all steps are performed in a closed volume filled with an inert gas at a reduced pressure in the range from 0.0001-0.01 barA.

3. The method according to claim 1, wherein all steps are performed in a closed volume filled with an inert gas 8 at a pressure in the range from 0.01-6 barA flowing through said closed volume.

4. The method according to claim 3, wherein directing the ejected heavy metal droplets involves intercepting them by a controlled stream of the gas, while cooling down of the heavy metal droplets involves additionally accelerated cooling by convection with aid of said gas.

5. The method according to claim 3, wherein the electric arc is conducted additionally in a shield inert gas.

6. The method according to claim 5, wherein the shield inert gas is a mixture of argon with at least 10% addition of helium per volume.

7. The method according to claim 1, wherein the electric arc is generated so as one of the following conditions is met: low voltage electricity is in the range of 10-40 V, the current in the electric arc is in the range from 80 to 350 A.

8. The method according to claim 1, wherein in a plane XY parallel to a direction of ejection of the heavy metal droplets and extending through a longitudinal axis Y of the sonotrode, the cathode is positioned above the sonotrode and oriented at an angle α equal to 0-40° measured from an axis X perpendicular to the direction of ejection of the heavy metal droplets.

9. The method according to claim 1, wherein the electric arc is generated with a DC current modified with pulsations between minimum equal to at least 50 Amp and maximum equal to up to 350 Amp and at frequency between 20 and 1000 Hz.

10. The method according to claim 9, wherein the frequency of DC pulsations of the electric arc is between 50-400 Hz.

11. The method according to claim 9, wherein the frequency of DC pulsations of the electric arc is synchronized with pulsations of a vibration transducer of the sonotrode.

12. The method according to claim 1, wherein the electric arc is AC electric arc with the peak value of the current in the range of 80-350 A at a frequency between 100 and 50000 Hz.

13. The method according to claim 12, wherein the AC current frequency is in the range of 5 to 50% of ultrasonic frequency of the sonotrode.

14. The method according to claim 12, wherein the AC current frequency is at a fraction chosen among $\frac{1}{10}$, $\frac{1}{9}$, $\frac{1}{8}$, $\frac{1}{7}$, $\frac{1}{6}$, $\frac{1}{5}$, $\frac{1}{4}$, or $\frac{1}{3}$ of ultrasonic frequency at the sonotrode.

15. The method according to claim 1, wherein the heavy metal raw material is pre-heated by an auxiliary heat source to a temperature up to 70% of the melting temperature (in degrees Kelvin) of the heavy metal raw material.

16. The method according to claim 1, wherein the heavy metal raw material is chosen among gold, silver, copper, platinum, palladium, iridium, ruthenium, rhodium, uranium, tantalum, osmium, hafnium or any alloy composed of them.

* * * * *